United States Patent [19]

Nishikawa et al.

[11] Patent Number: 4,561,083
[45] Date of Patent: Dec. 24, 1985

[54] MEMORY CIRCUIT WRITE-IN SYSTEM

[75] Inventors: Kazunori Nishikawa, Machida; Yoshiki Iwasaki, Yokohama; Isao Masuda, Sagamihara; Shoji Ueno, Zama; Makoto Komura, Tokyo; Nobuaki Takahashi, Yamato, all of Japan

[73] Assignee: Victor Company of Japan, Ltd., Yokohama, Japan

[21] Appl. No.: 496,589

[22] Filed: May 20, 1983

[30] Foreign Application Priority Data

May 26, 1982 [JP] Japan ................... 57-89388

[51] Int. Cl.⁴ .............................................. H04N 5/76
[52] U.S. Cl. ...................................... 369/59; 358/336; 358/339; 360/36.2; 360/38.1; 360/39; 360/51
[58] Field of Search ................... 358/342, 336, 339; 360/36.2, 38.1, 39, 51; 369/59; 365/189

[56] References Cited

U.S. PATENT DOCUMENTS 4,134,131  1/1979  Hopkins, Jr. .............. 358/339 X
4,215,376  7/1980  Mach ........................ 358/339 X
4,477,842  10/1984 Kaneko ......................... 369/59

FOREIGN PATENT DOCUMENTS 2492149  10/1981  France .
1079912   8/1964   United Kingdom .
1438802   10/1973  United Kingdom .
2084363A  8/1981   United Kingdom .

Primary Examiner—Robert L. Richardson
Attorney, Agent, or Firm—Roberts, Spiecens & Cohen

[57] ABSTRACT

A memory circuit write-in system comprises a first circuit for supplying a digital signal including a time base fluctuation component, where one frame of the digital signal is constituted by at least a synchronizing signal and information data and the digital signal has a first repetition frequency with a period of one frame of the digital signal, a memory circuit for writing therein and reading out therefrom the digital signal supplied from the first circuit, and a second circuit for applying a write-in control signal to the memory circuit. The write-in control signal includes no time base fluctuation component and has a second repetition frequency substantially equal to the first repetition frequency, and the memory circuit is controlled by the write-in control signal so that write-in of the digital signal is carried out with a write-in period in a range of two times within the one frame period.

4 Claims, 8 Drawing Figures

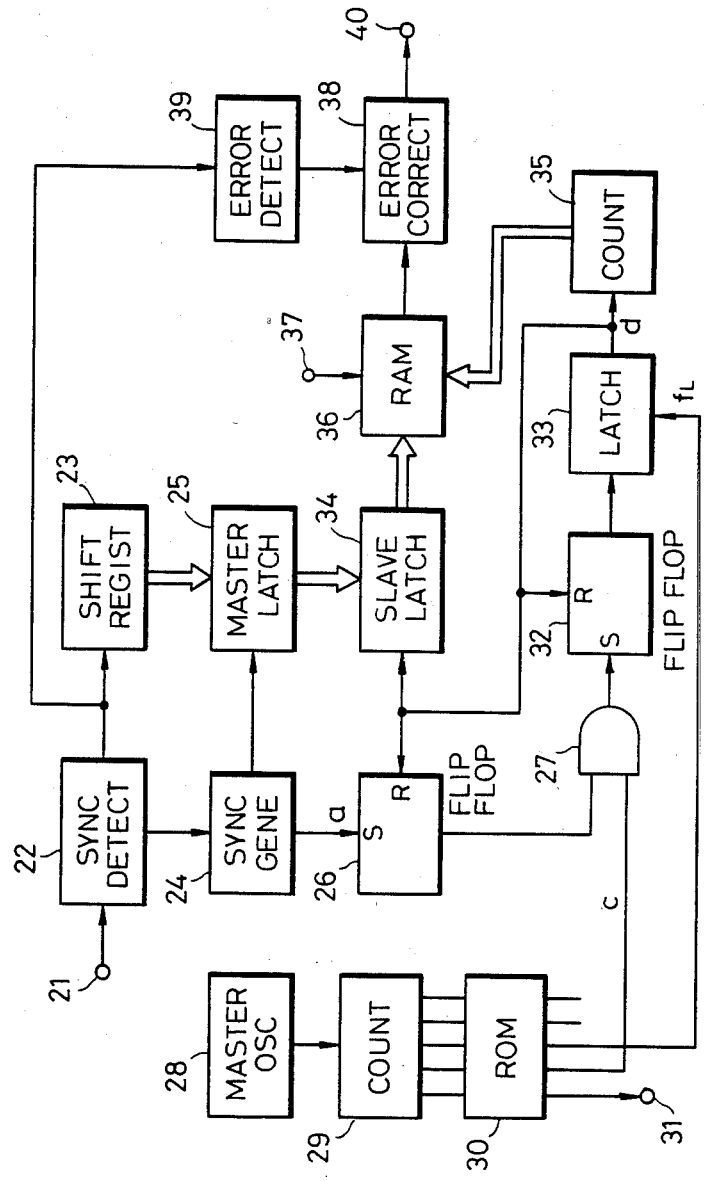

MEMORY CIRCUIT WRITE-IN SYSTEM

BACKGROUND OF THE INVENTION

The present invention generally relates to memory circuit write-in systems, and more particularly to a memory circuit write-in system which writes information data within a digital signal which is transmitted including a time base fluctuation component (jitter component) into a memory circuit, with a write-in period in a range of two times within a transmission period corresponding to one frame (one block) of the digital signal.

Generally, systems for recording and reproducing information signals onto and from a rotary recording medium (hereinafter simply referred to as a disc) have been reduced to practice. According to such systems, an analog information signal such as a video signal and an audio signal is subjected to digital pulse modulation such as pulse code modulation (PCM), and the digital information signal is recorded onto the disc as variations in geometrical configuration consisting of rows of intermittent pits. The recorded signal is reproduced from the disc by detecting the variations in the intensity of light reflected from the disc or variations in electrostatic capacitance between the disc and a reproducing element. When reproducing the recorded signal from the disc in such systems, the digital signal reproduced from the disc generally includes a time base fluctuation component (jitter component) due to irregular rotation of the disc and the like.

On the other hand, if errors are introduced in the data upon transmission of the above digital signal, it becomes necessary to correct the error and restore the data. Hence, one frame (one block) of the above digital signal is constituted by a time-sequentially multiplexed signal comprising error correcting codes, error detecting codes, and synchronizing signals for indicating beginnings of the signals, in addition to data words which are divided into predetermined sections. Thus, the digital signal is recorded and reproduced in terms of such frames. Accordingly, it becomes necessary to provide a memory circuit in the reproducing system, in order to store the data words and the error correcting codes. Because the digital signal is reproduced including the above time base fluctuation component, even if the minimum period of fluctuation in the time base fluctuation component is sufficiently large compared to the period of one frame of the digital signal (the period of one frame of the digital signal is generally equal to an integral multiple of the reciprocal of the sampling frequency, and this period of one frame will hereinafter be referred to as "frame period"), the write-in frame period with which the write-in is carried out with respect to the memory circuit and the read-out frame period with which the read-out is carried out with respect to the memory circuit are not in synchronism.

Conventionally, as a method of writing the data words and the error correcting codes within the digital signal which includes the above time base fluctuation component into the memory circuit, there was a method according to which a number of flags corresponding to the number of data words and error correcting codes within one frame were set, and the write-in was carried out in accordance with the time base fluctuation component by cancelling the flags one by one every time the data word or the error correcting code is written into memory elements from one of a plurality of slave latches which are provided. However, according to this conventional method, it was impossible to write the data words and the error correcting codes within one frame together at a single address in the memory circuit, and the write-in of these data words and error correcting codes within the one frame had to be carried out in parts. Accordingly, the above described flags were required to determine the write-in state of the digital signal, that is, discriminate which part or parts of the one frame of digital signal have been written into the memory circuit. As a result, there was a need to provide a considerable number of addresses in the memory circuit according to this conventional method. Therefore, this conventional method suffered a disadvantage in that the control of the memory circuit became complex, because the operations involved to determine what kind of signal is stored and which address contains such a signal, are quite complex.

In general, the minimum period of the time base fluctuation component included within the digital signal which is reproduced from the disc by the reproducing system, is sufficiently large compared to the frame period. In addition, the time base fluctuation component in the reproduced digital signal is not particularly large. The present inventors derived the present invention by especially noting such facts.

SUMMARY OF THE INVENTION

Accordingly, it is a general object of the present invention to provide a novel and useful memory circuit write-in system in which the above described disadvantages have been overcome.

Another and more specific object of the present invention is to provide a memory circuit write-in system in which one frame of a digital signal is constituted by at least a synchronizing signal and information data, and a memory circuit which writes in and reads out the digital signal including a time base fluctuation component in terms of frames at a first repetition frequency, is controlled by a signal including no time base fluctuation component and having a second repetition frequency which is selected to a frequency substantially equal to twice the first repetition frequency, so as to write the information data into the memory circuit with a write-in period in a range of two times within a transmission period corresponding to one frame of the digital signal.

Other objects and further features of the present invention will be apparent from the following detailed description when read in conjunction with the accompanying drawings.

BRIEF DESCRIPTION OF THE DRAWINGS

FIG. 2 is a systematic block diagram showing an embodiment of the memory write-in system according to the present invention used in a decoder in the block system shown in FIG. 1;

DETAILED DESCRIPTION

Figure 1:
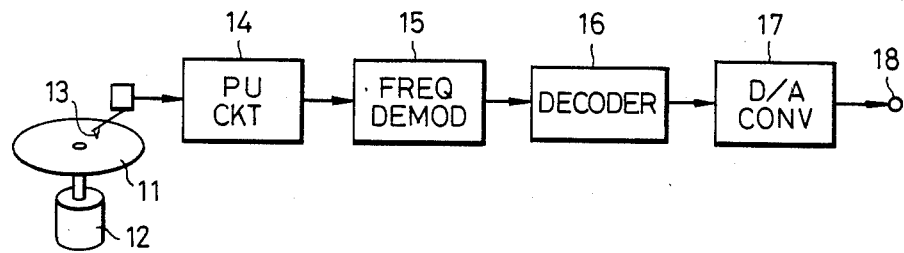
FIG. 1 is a general systematic block diagram showing an essential part of a disc reproducing apparatus which may be applied with a memory circuit write-in system according to the present invention.

In FIG. 1, a digital signal obtained through digital pulse modulation, is recorded on a disc 11. The disc 11 is rotated by a motor 12, and the signal recorded on the disc 11 are reproduced by a pickup device 13. This pickup device 13 may be an electrostatic capacitance type pickup device which picks up the signal as variations in electrostatic capacitance, or a so-called optical type pickup device which picks up the signal by use of a laser beam.

The signal thus picked up by the pickup device 13 is supplied to a frequency demodulator 15, through a pickup circuit 14 which includes a preamplifier. The picked up signal is thus frequency demodulated at the frequency demodulator 15, and the demodulated digital signal is supplied to a decoder 16. A predetermined signal processing such as jitter compensation and error correction which will be described hereinafter, is carried out at the decoder 16. A digital signal from the decoder 16 is converted into an analog signal at a digital-to-analog (D/A) converter 17, and the analog signal is obtained through an output terminal 18.

Figure 3:
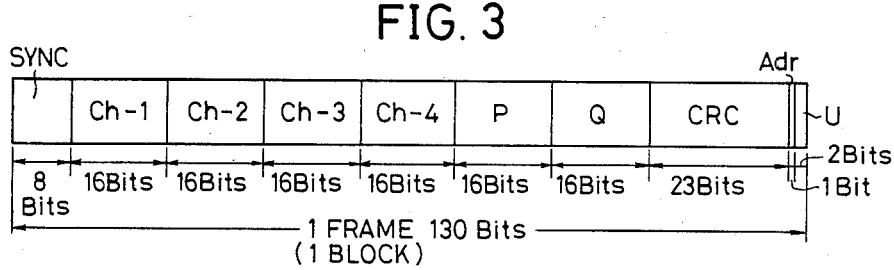
FIG. 3 diagrammatically shows an example of a digital signal format.

The reproduced digital signal supplied to the decoder 16 has a signal format shown in FIG. 3. FIG. 3 shows one frame (that is, one block) of the reproduced digital signal. As shown, one frame comprises 130 bits. In FIG. 3, synchronizing signal bits having an 8-bit fixed pattern for indicating the beginning of a frame, are indicated by SYNC. 16-bit 4-channel digital information signals are respectively indicated by Ch-1 through Ch-4. Ch-1 through Ch-4 indicate a multiplexed position of one word of the signal in each channel, where three (or two) channels contain digital audio signals and one (or two) channel contains a digital video signal, the four channels contain two kinds of 2-channel digital audio signals, or the four channels contain a 4-channel digital audio signal, for example. Further, 16-bit error correcting codes are indicated by P and Q. These error correcting codes are produced from the 16-bit data from each of the four channels Ch-1 through Ch-4, according to predetermined producing equations. A 23-bit error detecting code is indicated by CRC. This error detecting code CRC is a 23-bit remainder obtained when each of the data (hereinafter referred to as "information data") in the channels Ch-1 through Ch-4 and the error correcting codes P and Q which correspond to the 9-th through the 104-th bit in FIG. 3, is divided by a producing polynomial $x^{23}+x^5+x^4+x+1$, for example. It is detected that there is no error when the remainder is zero. In addition, a bit Adr corresponds to one bit of a 196-bit control signal which is used for operations such as random access, and this 196-bit control signal is transmitted by 196 frames of the digital signal. Further, two bits indicated by U in FIG. 3 correspond to so-called users' bits which are reserved for possible future use.

One frame of the above described digital signal comprising a total of 130 bits from the synchronizing bits SYNC to the users' bits U, has a repetition frequency of 44.1 kHz which is equal to the sampling frequency, for example. The digital signal is recorded onto the disc 11 in series in terms of frames, with a transmission bit rate of 5.733 Mbit/sec. Accordingly, if the rotational speed of the disc 11 is set at 900 rpm, 2940 frames of the digital signal will be recorded for one revolution of the disc 11, and the 196-bit control signal described before will be recorded 15 times for one revolution of the disc.

The digital signal reproduced from the disc 11 includes a time base fluctuation component (jitter component) due to irregular rotation of the disc 11 and the like. This time base fluctuation component is relatively small, and the minimum period of the time base fluctuation component is sufficiently large compared to the frame period described before. Moreover, because the reproduced digital signal has a period in terms of the above one frame, the reproduced digital signal includes a first repetition frequency which is equal to the reciprocal of the frame period.

The decoder 16 shown in FIG. 1 comprises a block system shown in FIG. 2 for reducing the present invention to practice. The reproduced digital signal having each of its frames constituted by the above 130 bits, which is obtained from the frequency demodulator 15, is supplied to a synchronizing signal detecting circuit 22 through an input terminal 21 shown in FIG. 2. The synchronizing signal SYNC is detected in the synchronizing signal detecting circuit 22, and the detected synchronizing signal SYNC is supplied to a synchronizing signal generating circuit 24. On the other hand, the reproduced digital signal which is passed through the synchronizing signal detecting circuit 22, is supplied to shift register 23 wherein the signal is subjected to series-to-parallel conversion. The synchronizing signal detecting circuit 22 does not synchronize with information data and error detecting codes which contain the same signal pattern as the synchronizing signal, and only detects the true control signal multiplexed at the position indicated by SYNC in FIG. 3.

Because the synchronizing signal is recorded with the frame period of 130 bits, if a synchronizing signal which should originally be obtained with a period substantially equal to the frame period is missing due to signal dropout and the like, the synchronizing signal generating circuit 24 generates a synchronizing signal which was independently produced at the time when the signal dropout occurred. Accordingly, even if the synchronizing signal is missing due to signal dropout and the like, or a signal pattern identical to that of the synchronizing signal exists in the information data and the like, the synchronizing signal detecting circuit 22 constantly detects only the true synchronizing signal. And, the synchronizing signal generating circuit 24 generates the synchronizing signal through detection of the true synchronizing signal carried out in the synchronizing signal detecting circuit 22, and generates the synchronizing signal having a period substantially equal to the frame period by compensating for the signal dropout as described above. For example, the synchronizing signal generating circuit 24 comprises a 130-counter which assumes a counted value of zero every time 130 clock signals are counted, and is reset by the output of the synchronizing signal detecting circuit.

A synchronizing signal a shown in FIG. 4(A) which is obtained from the synchronizing signal generating circuit 24, includes the time base fluctuation component introduced upon reproduction. This synchronizing signal a is supplied to a master latch 25, to latch the parallel output information data from the shift register 23. On the other hand, the synchronizing signal a is applied to a set terminal S of a flip-flop 26, to set the flip-flop 26. When the flip-flop 26 is set, an output signal of the flip-flop 26 is supplied to one input terminal of an AND-gate 27.

On the other hand, if the frequency of one frame is designated by $f_s$, a master oscillator 28 produces a reference signal having a frequency 140$f_s$. The oscillation output of the master oscillator 28 is supplied to a 140-counter 29 which assumes a counted value of zero every time 140 input signals are counted. An output of the counter 29 is supplied to a read only memory (ROM) 30. A write-in period discriminating signal c shown in FIG. 4(C) is obtained through a certain output line of the ROM 30, and supplied to the other input terminal of the AND-gate 27. Because the write-in period discriminating signal c is produced according to the output of the master oscillator 28, the write-in period discriminating signal c does not include a time base fluctuation component as may be readily understood. The AND-gate 27 is opened by the output of the flip-flop 26 when the flip-flop 26 is in the set state, to pass the discriminating signal c and supply the discriminating signal c to a set terminal S of a flip-flop 32.

An output signal of the flip-flop 32 is supplied to a latch circuit 33 and latched. The latch circuit 33 carries out the latching operation according to a latch signal $f_L$ obtained through another output line of the ROM 30. This latch signal $f_L$ is substantially equal to a signal obtained by frequency-dividing the output signal of the master oscillator 28 by 1/N, where N is a natural number greater than or equal to two, and the period of the signal is set an interval shorter than ½ the minimum pulse interval of the write-in period discriminating signal c. The write-in period discriminating signal c and the latch signal $f_L$ respectively obtained from the ROM 30 are in synchronism with each other. Thus, a pulse d shown in FIG. 4(D) having a constant pulse width, is always obtained from the latch circuit 33.

The output pulse d of the latch circuit 33 is supplied to respective reset terminals R of the flip-flops 26 and 32, to reset these flip-flops 26 and 32. In addition, the output pulse d of the latch circuit 33 is supplied to a slave latch 34 wherein the parallel output information data from the master latch 25 is latched.

Assume a case where the flip-flop 32 and the latch circuit 33 are not provided, and the output signal of the AND-gate 27 is directly supplied to the slave latch 34 and to the reset terminal R of the flip-flop 26, simultaneously. In this case, the output signal of the flip-flop 26 includes the time base fluctuation component, however, the write-in period discriminating signal c does not include the time base fluctuation component. For this reason, the signals supplied to the AND-gate 27 are not in synchronism with each other, and the pulse width of the output signal of the AND-gate 27 may become narrower than the pulse width of the write-in period discriminating signal c. In such a case where the pulse width of the output signal of the AND-gate 27 is narrower than the pulse width of the write-in period discriminating signal c, the circuit operation will not be carried out positively. Accordingly, in the present embodiment shown in FIG. 2, the flip-flop 32 and the latch circuit 33 are provided in order to obtain the pulse d which has the constant pulse width wider than the pulse width of the write-in period discriminating signal c. By the provision of these flip-flop 32 and the latch circuit 33, the circuit operation is carried out positively.

The output pulse d of the latch circuit 33 is supplied to a counter 35 wherein the pulse d is counted. An output counted value of the counter 35 is applied to a random access memory (RAM) 36, and used as a write-in address signal. In the present embodiment, it will be assumed that the write-in addresses are consecutive numbers or addresses, for the sake of simplifying the explanation. However, in most practices, the information data is interleaved and then recorded, and the reproducing system carries out a de-interleaving operation upon reproduction to restore the reproduced signal to its original sequence. This means that in actual practice, a constant corresponding to the interleaving length (unit) and the like are added to the write-in address, and used as the write-in address for the RAM 36.

A signal obtained through an output line of the ROM 30, is applied to the RAM 36 through a terminal 37 as a write enable signal. The RAM 36 writes in the information data from the slave latch 34, at an address thereof designated by the counter 35. In addition, the RAM 36 reads out the stored information data with a constant read-out frame period. The information data read out from the RAM 36 is supplied to an error correcting circuit 38. The address in the RAM 36 which is designated by the counter 35, changes with every incoming pulse d as shown by reference characters A1, A2, ... in FIG. 4(E).

Figure 4:
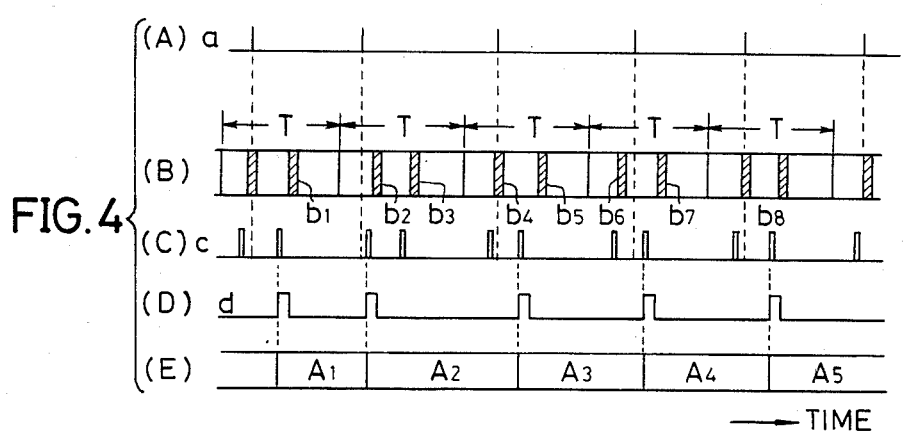
FIGS. 4(A) through 4(E) are time charts respectively showing signals for explaining the operation of the block system shown in FIG. 2.

In the present embodiment, the write-in period discriminating signal c is generated twice as shown in FIG. 4(C), within the constant read-out frame period T (T=1/$f_s$) shown in FIG. 4(B). Accordingly, the write-in period of the RAM 36 exists twice within the read-out frame period T as shown by hatchings in FIG. 4. That is, the RAM 36 is controlled so that the information data within the digital signal which is transmitted with the first repetition frequency of approximately 44.1 kHz, is written in with a second repetition frequency which is substantially twice the first repetition frequency, that is, 88.2 kHz.

Description will be given in more detail in conjunction with FIGS. 4(B) and 4(E). During a write-in period $b_1$ indicated by the hatching in FIG. 4(B), the information data is written into the address A1 shown in FIG. 4(E). On the other hand, during the write-in periods $b_2$, $b_3$, and $b_4$, the same information data is written into the same address A2. That is, because the digital signal of the same one frame is obtained during an interval between a time when the synchronizing signal a is generated and a time when a subsequent synchronizing signal is generated, in the present embodiment, the write-in address in the RAM 36 is changed according to the write-in period discriminating signal c obtained immediately after the synchronizing signal a is obtained. Thus, by changing the write-in address according to the time base fluctuation component in the reproduced digital signal as shown in FIG. 4(E), the same information data is repeatedly written in at the address A2 during the write-in periods $b_2$, $b_3$, and $b_4$.

Similarly, during write-in periods $b_5$ and $b_6$, the same information data, that is, the information data subsequent to the information data stored at the address A2, is written into the address A3. Information data subsequent to the information data stored into the address A3, is repeatedly written in at the address A4 during write-in periods $b_7$ and $b_8$. Hence, the information data including the time base fluctuation component successively written into consecutive addresses in the RAM 36, without dropping the information data or storing the same information data at different addresses. According to the present embodiment, the same information data may be repeatedly written in at the same address during subsequent write-in periods, however, the same information data will not be stored at different addresses. In FIG. 4(B), the read-out is carried out within intervals other than the write-in periods. Because the read-out is carried out according to a read-out control signal produced from the master oscillator 28, the information data is read out with the time base fluctuation component eliminated.

The information data read out from the RAM 36, is supplied to the error correcting circuit 38. On the other hand, the reproduced digital signal which has passed through the synchronizing signal detecting circuit 22, is supplied to an error detecting circuit 39. The error detecting circuit 39 divides the signal corresponding to the 9-bit through the 127-th bit shown in FIG. 3 by the polynomial $x^{23}+x^5+x^4+x+1$, and discriminates that the information data within the signal of that frame contains no error when the remainder obtained as a result of the division is zero. When this remainder is not zero, the error detecting circuit 39 discriminates that the information data within the signal of that frame contains error, and causes the error correcting circuit 38 to correct the error in the information data which is read out from the RAM 36. The error correcting circuit 38 uses the error correcting code P and/or the error correcting code Q and carries out modulo-2 addition with respect to each bit of the four data words in the channels Ch-1 through Ch-4, to correct the error and restore the information data. When there is no error in the information data, the error correcting circuit 38 passes the information data as it is. Thus, the error correcting circuit 38 supplies the information data containing no error or the corrected and restored information data to the D/A converter 17, through an output terminal 40. The sequence in which the error in the information is corrected and the information data is restored can be carried out accurately, because the output from the RAM 36 is eliminated of the time base fluctuation component. The information data is subjected to digital-to-analog conversion in the D/A converter 17, and 4-channel analog information signals are produced through the output terminal 18.

Further, the present invention is not limited to these embodiments, but various variations and modifications may be made without departing from the scope of the present invention.

What is claimed is:

1. A memory circuit write-in system comprising:
   terminal means for receiving a digital signal including a time base fluctuation component, one frame of said digital signal being constituted by at least a synchronizing signal and information data, said digital signal having a repetition frequency with a period of one frame of said digital signal;
   a memory circuit for writing therein and reading out therefrom the received digital signal;
   a first flip-flop which is set in response to the synchronizing signal within said received digital signal;
   a master oscillator for producing a signal which includes no time base fluctuation;
   a circuit for generating a write-in period discriminating signal, a latch pulse and a write enable signal from the output signal of said master oscillator, said write-in period discriminating signal being generated twice within one read-out frame period which is constant and substantially equal to said period of one frame, said latch pulse having a period which is less than ½ a minimum pulse interval of said write-in period discriminating signal;
   a gate circuit responsive to an output signal of said first flip-flop and to said write-in period discriminating signal for passing said write-in period discriminating signal when said first flip-flop is in a set state; and
   write-in control signal generating means responsive to said gate circuit for producing a write-in control signal in response to the write-in period discriminating signal which occurs immediately after said synchronizing signal,
   said memory circuit being controlled by said write-in control signal so that a write-in address at which the digital signal is written is changed in response to said write-in control signal, and the digital signal is written into said memory circuit during a write-in period which exists twice within the constant read-out frame period in correspondence with said write-in period discriminating signal.

2. A memory circuit write-in system as claimed in claim 1 in which said memory circuit comprises a shift register supplied with the digital signal received by said terminal means for subjecting the digital signal to series-to-parallel conversion; a master latch for latching said information data within said one frame among parallel output signals from said shift register; a slave latch for latching parallel output signals of said master latch by said write-in control signal; a counter for counting said write-in control signal and producing a write-in address; and a random access memory for writing output information data of said slave latch at said write-in address designated by said counter at a double rate within the constant read-out frame period.

3. A memory circuit write-in system as claimed in claim 1 in which said circuit for generating said write-in period discriminating signal, said latch pulse, and said write enable signal comprises a counter for frequency-dividing the output signal of said master oscillator and producing a signal with a one frame period, and read only memory supplied with the output signal of said counter as a read-out control signal, and said read only memory produces said write-in period discriminating signal, said latch pulse, and said write enable signal through mutually different output lines thereof.

4. A memory circuit write-in system as claimed in claim 1 in which said memory circuit write-in system comprises synchronizing signal generating means for generating a synchronizing signal in synchronism with the synchronizing signal within the digital signal received by said terminal means, said first flip-flop being set by the output synchronizing signal of said synchronizing signal generating means, and said write-in control signal generating means comprises a second flip-flop which is set by the output write-in period discriminating signal of said gate circuit, and a latch circuit for latching an output signal of said second flip-flop in response to said latch signal and for resetting said first and second flip-flops by an output pulse thereof, said latch circuit producing as said write-in control signal a pulse which has a constant width and is in phase synchronism with said write-in period discriminating signal obtained immediately after the output synchronizing signal of said synchronizing signal generating means is obtained.

* * * * *